United States Patent [19]

Spethmann

[11] 4,210,957
[45] Jul. 1, 1980

[54] OPERATING OPTIMIZATION FOR PLURAL PARALLEL CONNECTED CHILLERS

[75] Inventor: Donald H. Spethmann, Arlington Hts., Ill.

[73] Assignee: Honeywell Inc., Minneapolis, Minn.

[21] Appl. No.: 904,170

[22] Filed: May 8, 1978

[51] Int. Cl.$^2$ ............... G05B 13/02; G06F 15/20; F24H 11/06

[52] U.S. Cl. ............... 364/105; 165/13; 62/175; 236/1 EA; 364/505

[58] Field of Search ............... 364/105, 505, 556, 557, 364/900; 165/13, 16, 19, 22; 236/1 EA; 62/175, 228 C, 228 D

[56] References Cited

U.S. PATENT DOCUMENTS

| | | | |
|---|---|---|---|
| 3,400,374 | 9/1968 | Schumann | 364/418 |
| 3,555,251 | 1/1971 | Shavit | 364/900 |
| 3,875,995 | 4/1975 | Mannion et al. | 165/22 |
| 3,995,443 | 12/1976 | Iversen | 165/19 |
| 4,084,388 | 4/1978 | Nelson | 165/22 |
| 4,122,893 | 10/1978 | Thompson | 165/22 |

*Primary Examiner*—Felix D. Gruber
*Attorney, Agent, or Firm*—Trevor B. Joike

[57] ABSTRACT

An optimization system for switching between plural parallel connected chillers in a refrigeration system is disclosed which system establishes optimized changeover criteria based upon the design refrigerant head for the chillers, the minimum refrigerant head for the chillers, the capacity of the chillers at design head and the capacity of the chillers at minimum head, and which system, using these criteria, calculates optimized switchover capacity as a function of the present actual refrigerant head. The system then compares the optimized switchover capacity to the present building load and, if the capacity is insufficient to meet the building load, an additional chiller is switched in and, if the optimized switchover capacity is greater than the building load and more than one chiller is operating, one of the chillers is disconnected.

17 Claims, 5 Drawing Figures

4,210,957

OPERATING OPTIMIZATION FOR PLURAL PARALLEL CONNECTED CHILLERS

BACKGROUND OF THE INVENTION

This invention relates to optimally switching chillers into and out of a refrigeration system in a building, and, more particularly, controlling the switching of these chillers as a function of at least the design refrigerant head and the actual refrigerant head of the chillers. To increase efficiency, the chillers are switched as a function of, not only design refrigerant head and actual refrigerant head, but also minimum refrigerant head, the capacity of the refrigerating system at the design refrigerant head and the capacity of the refrigerating system at minimum refrigerant head.

In order to meet the air-conditioning needs of large commercial buildings, refrigeration systems are provided having a plurality of chillers. It is apparent that in such systems comprising more than one chillers, it becomes necessary to decide how many chillers to use based upon present conditions and when additional chillers should be connected to or disconnected from the refrigeration system. Prior art systems were rudimentary in their approach to switching between plural chillers to satisfy the refrigeration needs of the building. If they were not simply switched into and out of the refrigeration system manually according to need, simple systems based upon actual building loads were used. If such a simple system comprised three chillers, for example, and if the actual building load was less than 33% one chiller was operated in the refrigeration system; but if the actual building load exceeded 33% of the total design capacity of the three chillers, two chillers were operated and all three chillers were operated if the actual building load exceeded 66% of the total design chiller capacity. If the actual building load dropped below the 66% capacity, the third chiller was disconnected and, if the actual building load dropped below the 33% capacity the second chiller was disconnected. These types of chiller controls do not optimize chiller performance, however, and do not conserve on the electrical energy needed to drive the chillers for providing refrigeration because the arbitrary 33% and 66% switchover points do not reflect optimized performance and may result in chillers being switched on or off when extra capacity is available from the machines operating just prior to switching. The system according to the present invention provides a more sophisticated system for determining the number of chillers which should be operated at any given time. The decision for switching is based upon actual conditions and the most efficient switchover points rather than switching chillers based upon a fixed percentage of total design capacity.

SUMMARY OF THE INVENTION

The present optimization system for switching between plural chillers in a plural chiller refrigeration system comprises an apparatus for measuring the load capacity which the building represents, determining the optimized switchover capacity based upon at least the design refrigerant head and the actual refrigerant head and for switching in additional chillers when the actual building load exceeds the optimized switchover capacity and for disconnecting chillers when the actual building load decreases below the switchover capacity of the chillers.

BRIEF DESCRIPTION OF THE DRAWINGS

These and other features and advantages will become apparent from a detailed consideration of the invention when taken in conjunction with the drawings in which.

DETAILED DESCRIPTION OF THE INVENTION

Figure 1:
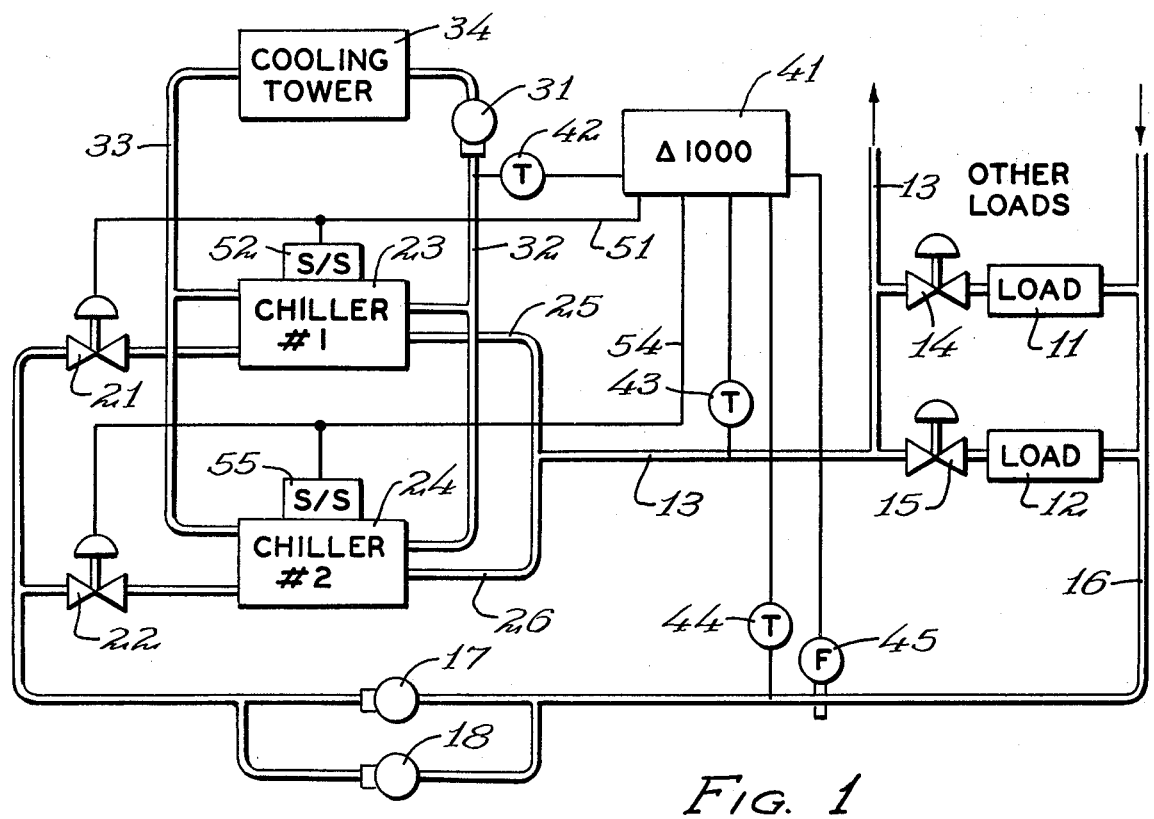
FIG. 1 is a diagram showing the refrigeration system and the control system for operating the chillers in the system.

In FIG. 1, loads 11 and 12 which may represent zones in a building are supplied with a refrigerant such as chilled water from supply line 13 through respective valves 14 and 15. In addition, supply line 13 supplies chilled water to the other loads in the building. Chilled water is returned from loads 11 and 12 and the other loads of a building through return line 16 and is circulated through the chiller system by pumps 17 and 18. The pumps 17 and 18 pump the chilled water back through valves 21 and 22 to respective chillers 23 and 24. The chillers chill the water and supply the chilled water to supply line 13 through their respective output lines 25 and 26. In addition, condenser water may be circulated through chillers 23 and 24 by pump 31 and lines 32 and 33 to cooling tower 34 to exhaust building heat. Thus, the heat of the building which is returned by the water in return line 16 to chillers 23 and 24 by pumps 17 and 18 is expelled from the building by use of cooling tower 34. Starting and stopping of chillers 23 and 24 as well as opening and closing of valves 21 and 22 are controlled by computer 41 which derives inputs from thermostat 42 sensing the temperature of the water being returned from the cooling tower 34, thermostat 43 for sensing the temperature of the refrigerant in supply line 13, thermostat 44 for sensing the temperature of the refrigerant in return line 16 and flow sensor 45 which senses the flow rate of the refrigerant in the refrigerating system. Thermostats 42, 43 and 44 may be Honeywell L7092 Temperature Sensor and flow sensor 45 may be a Honeywell P760 Pressure Difference Sensor. When the computer 41 determines that chiller 23 should be connected into the system, it sends a signal over output line 51 to open valve 21 and to start chiller 23 by way of starting motor 52. Likewise, when computer 41 determines that chiller 24 should be connected into the refrigerating system to supplement chiller 23 it supplies a signal over line 54 to starting motor 55 to start up chiller 24 and also to valve 22 to open it and allow refrigerant to be circulated through chiller 24.

Figure 2:
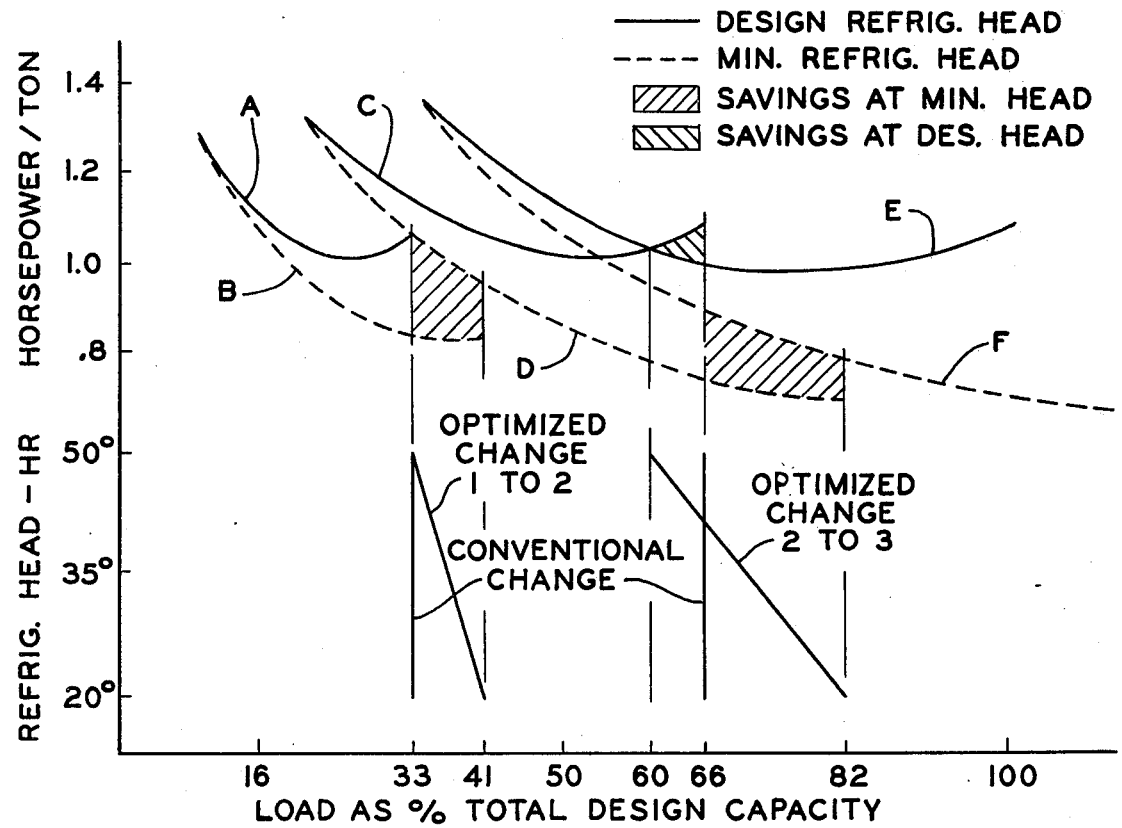
FIG. 2 is a graph showing horsepower/ton and refrigeration head versus the percent of the total design capacity of the refrigeration system.
Figure 3:
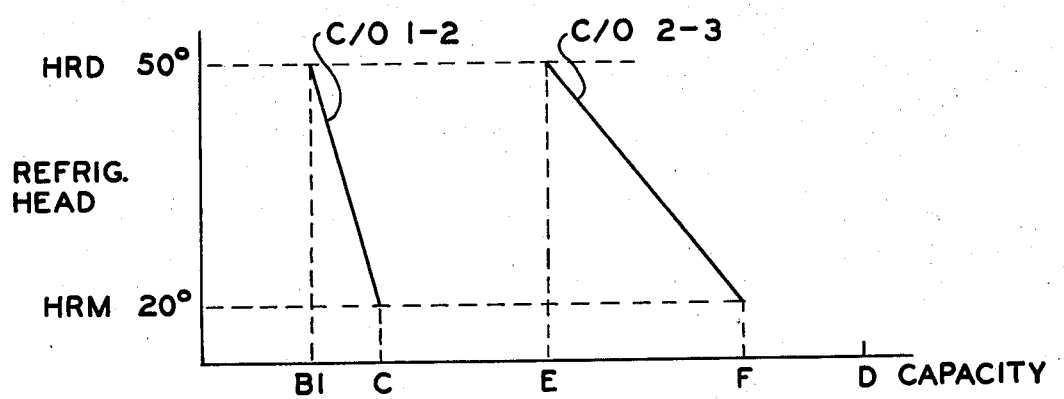
FIG. 3 is a graph of an isolated portion of the graph of FIG. 2.

FIGS. 2 and 3 show how the program which is used in computer 41 to control chillers 23 and 24 was derived. In FIG. 2, curve A represents the horsepower per ton characteristic of one chiller as a function of load at design refrigerant head. Curve B represents the horsepower per ton characteristic of the chiller as a function of load at minimum refrigerant head. Curve C represents the horsepower per ton characteristic of two parallel connected chillers as a function of load at design refrigerant head and curve D represents the horsepower per ton characteristic of two parallel connected chillers as a function of load at minimum refrigerant head. Curves E and F are similar curves but for three parallel connected chillers.

As discussed above, in a three-chiller system, the second chiller was started by prior art systems when the building load exceeded 33% of the total design capacity for three chillers. When the building load exceeded 66% of the design capacity of the three chillers, the third chiller was started. Going back the other way, when building load dropped below 66% of the design capacity for three chillers, the third chiller was disconnected from the system. As the building load continued to decrease and fell below 33% of the design capacity of the three-chiller system, the second chiller was disconnected from the system.

As can be seen from FIG. 2, this mode of operation does not best utilize the energy necessary to drive the chillers for refrigerating the building. If the system is operating at its design refrigerant head, the optimum point for switching between one and two chillers as shown by curve A is when all of the capacity of the one chiller is used. If the chiller is operating at its minimum refrigerant head, the optimum point to switch over to the second chiller as shown by curve B is at the end of the capacity of the first chiller. Thus, the graph on the lower portion of FIG. 2 shows the line extending from the optimized switchover point at design head to the optimized switchover point at minimum refrigerant head. The actual refrigerant head will be somewhere between these two extreme points along the optimized changeover line and can be used to determine the optimized switchover capacity.

In switching from two chillers to three chillers at design head, the optimum switchover point is at the intersection of curves C and E. At minimum refrigerant head, the optimized changeover point is at the end of the capacity of two chillers. Thus, the optimized chiller line extends from the intersection of curves C and E at design refrigerant head to the end of the capacities of two chillers at minimum refrigerant head. Again, the actual refrigerant head will be somewhere along this optimized changeover line and can be used to determine the optimized switchover capacity.

The shaded areas of FIG. 2 represent the potential saving when switching according to the optimized changeover graph as shown in FIG. 2 as opposed to the conventional switching known in the prior art.

The changeover curves of FIG. 2 have been reproduced in FIG. 3 as an aid in determining the equation for calculating the optimized switchover capacity for determining when the switchover between machines should occur. The general equation for defining the types of curves shown in FIG. 3 can be given by the general equation $$Y = K1(X - K2) \tag{1}$$

In the terms of the graph shown in FIG. 3, equation 1 becomes $$HD = K1(CAP - K2). \tag{2}$$

where HD is the refrigerant head and CAP is capacity. The slope, K1, can be given by the equation $$K1 = \frac{HRD - HRM}{B1 - C} \tag{3}$$

where HRD is the design refrigerant head for one chiller, HRM is the minimum refrigerant head for one chiller, B1 is the capacity of one chiller at design refrigerant head, and C is the capacity of one chiller at minimum refrigerant head. Substituting equation (3) into equation (2), equation (2) becomes $$HD = \frac{HRD - HRM}{B1 - C}(CAP - K2). \tag{4}$$

From equation (4), K2 can be given by the following expression:

$$K2 = CAP - \frac{HD(B1 - C)}{HRD - HRM}. \tag{5}$$

In order to solve equation (5) to determine the value for the constant K2, the point on the changeover curve between one and two chillers represented by the minimum refrigerant head can be substituted in equation (5). Specifically, C is substituted for the term CAP and HRM is substituted for the term HD which yields the following value for K2:

$$K2 = C - HRM\left(\frac{B1 - C}{HRD - HRM}\right). \tag{6}$$

Inserting K2 into equation (4), the actual refrigerant head is then given by $$HD = \left(\frac{HRD - HRM}{B1 - C}\right) CAP - \left[\frac{HRD - HRM}{B1 - C}\right]\left[C - HRM\left(\frac{B1 - C}{HRD - HRM}\right)\right]. \tag{7}$$

Equation 7 can be factored to yield the following equation:

$$HD = \frac{HRD - HRM}{B1 - C}(CAP - C) + HRM. \tag{8}$$

By changing signs in equation (8), the following equation can be derived:

$$HD = \frac{HRD - HRM}{C - B1}(C - CAP) + HRM. \tag{9}$$

If we introduce a third constant to our formula given by the following expression $$K3 = \frac{1}{\frac{HRD - HRM}{C - B1}} \tag{10}$$

and, multiplying through by the constant K3, equation (9) becomes $$(K3)(HD) = C - CAP + (HRM)(K3) \tag{11}$$

which reduces down to the following equation:

$$CAP = C - K3(HD - HRM). \tag{12}$$

Equation (12) therefore gives the optimized switchover capacity as a function of actual refrigerant head for switching between two chillers. The only variable in the equation is the refrigerant head, the other terms, C, K3 and HRM being constants and determined by the particular chillers selected for the refrigerating system shown in FIG. 1. The computer in FIG. 1 now computes the actual building load in terms of capacity and compares the actual building load to the optimized switchover capacity as derived by equation (12) and will connect in the second chiller if the building load exceeds the optimized switchover capacity and will disconnect the second chiller if the actual building load falls below the optimized switchover capacity.

Similarly, if three machines are used in a refrigeration system such as the one shown in FIG. 1, the optimized changeover capacity curve between two and three chillers can be given by the equation $$CAP = F - [(HD - HRM)K4]. \tag{13}$$

The slope for this equation, K4, can be given by the expression $$K4 = \frac{F - E}{HRD - HRM} \tag{14}$$

where F is the capacity of two machines at minimum refrigerant head, E is the capacity of two machines at design refrigerant head, HRD is the design refrigerant head and HRM is the minimum refrigerant head. Constant K4 is a fixed value depending upon chiller parameters and equation (13) has only one variable, HD, which is the actual chiller head of the chiller system.

The computer, by using sensors 43, 44 and 45 determines actual head, HD, and uses the value of the actual head in equations (12) and (13) to determine the optimized switchover capacities for optimally switching between chillers. The computer also uses these sensors to determine actual building load in terms of capacity so that the actual building load can be compared to the optimum switchover capacity. The computer 41 uses the inputs from sensors 43, 44 and 45 as inputs to equations 12, 13 and 15 which input to the program shown in FIGS. 4 and 5 for controlling chillers 23 and 24 by way of output lines 51 and 54.

Figure 5:
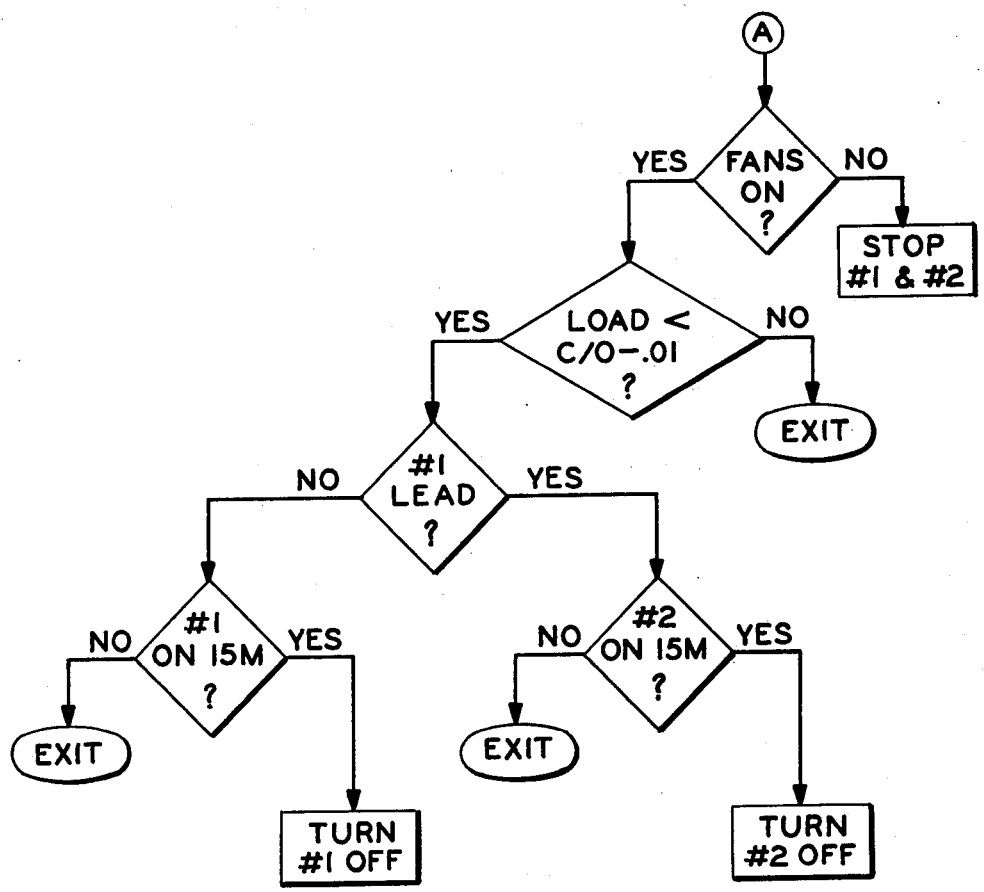
FIGS. 4 and 5 show a flowchart of the program which can be used with the computer shown in FIG. 1 to control the chillers.
Figure 4:
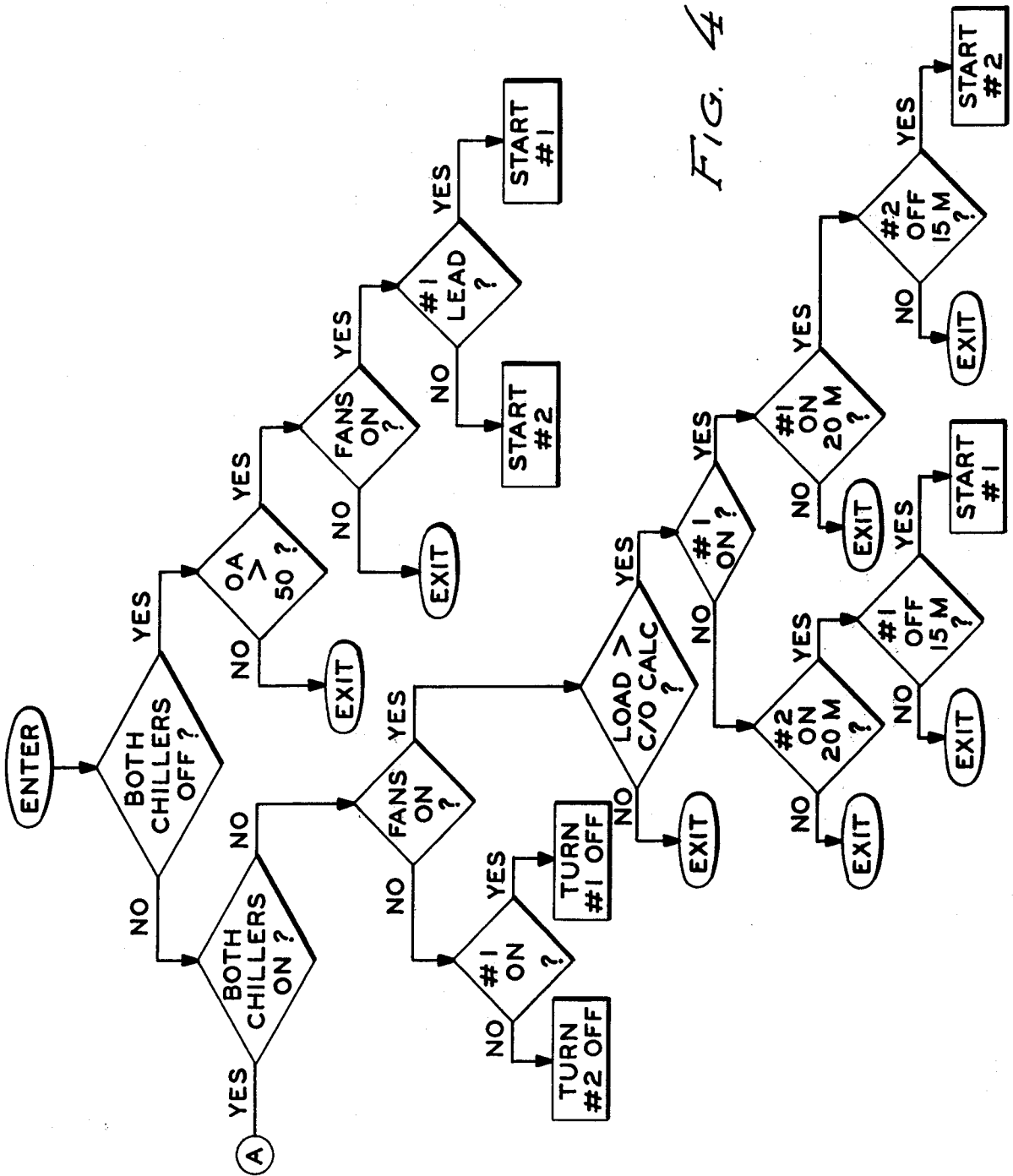

In FIGS. 4 and 5, the program is entered periodically, for example every minute. The first step of the program in FIG. 4 is to determine whether both chillers are off. If both chillers are off, if the outdoor air temperature is above 50° and if the fans of the refrigeration system are on, chiller 1 will be started if it is in the lead position and chiller 2 will be started if chiller 1 is not in the lead position. The determination of which chiller is in the lead position is a manual switch operation to determine which chiller should be turned on first and disconnected last. The fans may be turned on by an optimized start/stop program or device which are known in the art and which turn on the fans in the morning as a function of both time and outdoor temperature and turn the fans off at night as a function of time. In this manner, at least one chiller is running as long as the fans are on and the outdoor temperature is above 50°. If the outdoor air temperature is below 50°, or if the fans are not on, no chillers will be started and the program will exit to re-enter again a predetermined length of time later.

If after entering the program, it is determined that both chillers are not off, a test is made to determined whether both chillers are on. If both chillers are not on, then only one chiller is on and a test is made to determined whether the fans are on. If the fans are not on, and if chiller 1 is on, chiller 1 will be turned off. If the fans are not on and chiller 1 is not on, chiller 2 must be on and it will be turned off. No chillers should be operating when the fans are off. If the fans are on, it is next determined whether the building load in terms of capacity is greater than the optimized switchover capacity as determined by solving equation (12). If the actual building load is not greater than the optimized switchover capacity, no additional chiller need be switched in and the program exits. If the actual building load capacity is greater than the optimized switchover capacity, another chiller must be started. To determine which chiller should be started, a test is made to determine whether chiller 1 is on. If chiller 1 is not on, then chiller 2 must be on, but if chiller 2 has not been on for twenty minutes, it is not desirable to add chiller 1 at this time. Therefore, the program exits to wait for the passage of twenty minutes. After chiller 2 has been on for twenty minutes, a test determines whether or not chiller 1 has been off for fifteen minutes. A chiller should not be restarted until it has been off for at least fifteen minutes. If chiller 1 has not been off for fifteen minutes, the program exits to wait for the passage of fifteen minutes. If chiller 1 has been off for fifteen minutes, it is started.

If chiller 1 is the chiller that was on, and chiller 2 off, a determination is made whether chiller 1 has been on for twenty minutes. If not, the program exits to wait twenty minutes. If it has, it is next determined whether chiller 2 has been off for fifteen minutes. If it has not, the program exits to wait the passage of fifteen minutes. If it has, chiller 2 is started.

If both chillers have been on, the program proceeds to point A of FIG. 5 where a determination is made whether or not the fans are on. If the fans are not on, then both chillers must be stopped. If the fans are on, a test is made to determine whether the actual building load in terms of capacity is less than the optimized switchover capacity as determined by the solution of equation (12) minus a small differential of 0.01. If the actual building load is not less than this optimized switchover capacity, the program exits. If it is, then one of the chillers should be turned off. Thus, if the chiller 1 is the lead chiller, a test is made to determine whether chiller 2 has been on for fifteen minutes. If it has, it will be turned off; and if it has not, the program will exit to await the passage of fifteen minutes. If the chiller 1 is not the lead chiller, then a test is made to determine whether chiller 2 has been on for fifteen minutes. If it has, it is turned off; if it has not, the program exits to await the passage of 15 minutes.

As can be seen, the program flowchart shown in FIGS. 4 and 5 will control the switching on and off of the chillers according to the optimal mode for so doing. The flowcharts of FIGS. 4 and 5 together with the equations disclosed herein are sufficient to enable a programmer to program the DELTA 1000 computer to carry out the invention, however as an additional aid the programmer may wish to refer to Honeywell publication Form No. 74-1157 entitled ALPHA/DELTA 1000 control interpreter language basic theory. The flow charts only cover two chillers and it is apparent that, if more chillers are added, the program must be expanded. Also, building load is given by the equation $$\text{Load} = Kp\sqrt{\Delta P}(TR-TS)$$

where TR is the temperature of the return chilled water (15), TS is the temperature of the supply chilled water, P is the orifice pressure difference sensed by sensor 45, and Kp is the flow orifice constant.

The embodiments of the invention in which an exclusive property or right is claimed are defined as follows:

1. An optimization system for switching between at least first and second parallel connected chillers of a plural chiller refrigeration system, said chillers having an optimized range of changeover capacities defined at one end by an optimized changeover capacity at design refrigerant head of said first chiller and at the other end by an optimized changeover capacity at minimum refrigerant head of the first chiller, said optimization system comprising:

first means for supplying signals from which the actual load capacity of said building can be determined;

second means for supplying signals from which the actual refrigerant head of said chillers can be determined; and, third means responsive to said first and second means for determining said actual load capacity, said actual refrigerant head, an optimized switchover capacity based upon said actual refrigerant head, said design refrigerant head, said minimum refrigerant head, said optimized changeover capacity at said design refrigerant head and said optimized changeover capacity at said minimum refrigerant head, and for comparing said optimized switchover capacity to said actual load capacity to switch on both chillers when said actual load capacity exceeds said optimized switchover capacity and to switch off one of said chillers when said actual load capacity falls below said optimized switchover capacity.

2. The optimization system of claim 1 wherein said first means comprises a first temperature sensor for sensing the temperature of refrigerant leaving said chillers, a second temperature sensor for sensing the temperature of refrigerant entering said chillers and flow sensing means for sensing the flow rate of said refrigerant.

3. The optimization system of claim 2 wherein said second means comprises said first and second temperature sensors for providing said actual refrigerant head.

4. The optimization system of claim 3 wherein said third means comprises means for determining the optimized switchover capacity by the following equation $$CAP = C - K3(HD - HRM)$$

where C is the capacity of one chiller at minimum refrigerant head, HD is the actual refrigerant head, HRM is the minimum refrigerant head and K3 is given by the equation $$K3 = \frac{1}{\frac{HRD - HRM}{C - B1}}$$

where HRD is the design refrigerant head and B1 is the capacity of one machine at design refrigerant head.

5. The optimization system of claim 4 wherein said third means further comprises output lines connecting said third means to said first and second chillers.

6. The optimization system of claim 1 wherein said second means comprises first and second temperature sensors for sensing the temperature of supply and return refrigerant and providing said actual refrigerant head.

7. The optimization system of claim 6 wherein said third means comprises means for determining the optimized switchover capacity by the equation $$CAP = C - K3(HD - HRM)$$

where C is the capacity of one chiller at minimum refrigerant head, HD is the actual refrigerant head, HRM is the minimum refrigerant head and K3 is given by the equation $$K3 = \frac{1}{\frac{HRD - HRM}{C - B1}}$$

where HRD is the design refrigerant head and B1 is the capacity of one chiller at design refrigerant head.

8. The optimization system of claim 7 wherein said third means further comprises output lines connecting said third means to said first and second chillers.

9. The optimization system of claim 1 wherein said third means comprises means for determining the optimized switchover capacity by the equation $$CAP = C - K3(HD - HRM)$$

where C is the capacity of one chiller at minimum refrigerant head, HD is the actual refrigerant head, HRM is the minimum refrigerant head and K3 is given by the equation $$K3 = \frac{1}{\frac{HRD - HRM}{C - B1}}$$

where HRD is the design refrigerant head and B1 is the capacity of one machine at design refrigerant head.

10. An optimization system for switching between at least first and second parallel connected chillers of a plural chiller refrigeration system, said chillers circulating a refrigerant to said building, said chillers having an optimized range of changeover capacities defined at one end by an optimized changeover capacity at design refrigerant head of said first chiller and at the other end by an optimized changeover capacity at minimum refrigerant head of the first chiller, said optimization system comprising:

a first temperature sensor for sensing the temperature of said refrigerant supplied to said building;

a second temperature sensor for sensing the temperature of said refrigerant being returned to said chillers from the building;

a flow sensor for sensing the flow rate of said refrigerant; and, control means connected to said first and second temperature sensors and to said flow sensor for determining actual load requirements in terms of capacity for said building for determining actual refrigerant head and for determining an optimized switchover capacity based upon said actual refrigerant head, said design refrigerant head, said minimum refrigerant head, said optimized changeover capacity at said design refrigerant head and said optimized changeover capacity at said minimum refrigerant head, said control means including means for switching on an additional chiller when said actual building load in terms of capacity exceeds said optimized switchover capacity and for switching off a chiller when said building load in terms of capacity falls below said optimized switchover capacity.

11. The optimization system of claim 10 wherein said control means comprises first means for determining said actual load in terms of capacity of said building, second means for determining said optimized switchover capacity based upon said actual refrigerant head, said design refrigerant head, said minimum refrigerant head, said optimized changeover capacity at said design refrigerant head, and said optimized changeover capacity at said minimum refrigerant head, and comparing means for comparing said actual load in terms of capacity with said optimized switchover capacity.

12. The optimization system of claim 11 wherein said second means comprises means for determining the optimized switchover capacity by the equation $$CAP = C - K3(HD - HRM)$$

where C is the capacity of one chiller at minimum refrigerant head, HD is the actual refrigerant head, HRM is the minimum refrigerant head and K3 is given by the equation $$K3 = \frac{1}{\frac{HRD - HRM}{C - B1}}$$

where HRD is the design refrigerant head and B1 is the capacity of one machine at design refrigerant head.

13. The optimization system of claim 10 wherein said control means comprises means for determining the optimized switchover capacity by the equation $$CAP = C - K3(HD - HRM)$$

where C is the capacity of one chiller at minimum refrigerant head, HD is the actual refrigerant head, HRM is the minimum refrigerant head and K3 is given by the equation $$K3 = \frac{1}{\frac{HRD - HRM}{C - B1}}$$

where HRD is the design refrigerant head and B1 is the capacity of one machine at design refrigerant head.

14. A method for optimally switching on and off chillers in a parallel connected plural chiller refrigerant system, said chillers having an optimized range of changeover capacity defined at one end by an optimized changeover capacity at design refrigerant head and at the other end by an optimized changeover capacity at minimum refrigerant head, said method comprising the steps of:
  determining actual load of said building in terms of capacity;
  determining actual refrigerant head for said chillers;
  determining an optimized switchover capacity based upon actual refrigerant head, design refrigerant head, minimum refrigerant head, optimized changeover capacity at design refrigerant head, and optimized changeover capacity at minimum refrigerant head;
  comparing the actual load in terms of capacity and the optimized switchover capacity; and,
  switching on an additional chiller when the actual load in terms of capacity exceeds the optimized switchover capacity and switching off a chiller when the actual load in terms of capacity falls below the optimized switchover capacity.

15. The method of claim 14 wherein the step of measuring the actual load capacity comprises the further steps of:
  measuring the temperature of refrigerant leaving said chillers;
  measuring the temperature of refrigerant entering said chillers; and,
  measuring the flow rate of the refrigerant being circulated by the chillers.

16. The method of claim 15 wherein the step of determining actual refrigerant head comprises the steps of:
  measuring the temperature of refrigerant leaving said chillers; and,
  measuring the temperature of refrigerant entering said chillers.

17. The method of claim 16 wherein actual refrigerant head is determined by subtracting the temperature of the supplied refrigerant from the temperature of the returned refrigerant and wherein the step of determining the optimized switchover capacity is determined by using the actual refrigerant head to solve the equation $$CAP = C - K3(HD - HRM)$$

where C is the capacity of one machine at minimum refrigerant head, HD is the actual refrigerant head, HRM is the minimum refrigerant head and K3 is given by the equation $$K3 = \frac{1}{\frac{HRD - HRM}{C - B1}}$$

where HRD is the design refrigerant head and B1 is the capacity of one machine at minimum refrigerant head.

* * * * *